May 13, 1969 H. L. MARSHALL 3,444,423

PINCUSHION CORRECTION CIRCUIT

Filed May 19, 1967

INVENTOR.
HARRY LEE MARSHALL
BY PENDLETON, NEUMAN
SEIBOLD & WILLIAMS
ATTORNEYS

United States Patent Office 3,444,423
Patented May 13, 1969

3,444,423
PINCUSHION CORRECTION CIRCUIT
Harry Lee Marshall, 2131 Bueter Road,
Fort Wayne, Ind.
Filed May 19, 1967, Ser. No. 639,877
Int. Cl. H01j *29/70, 29/76*
U.S. Cl. 315—24 7 Claims

ABSTRACT OF THE DISCLOSURE

A pincushion correction circuit for a television receiver. Horizontal frequency current is induced in the vertical deflection windings to shock into oscillation a parallel resonant circuit connected in series with the vertical windings. Adjustment of the resonant circuit phase shifts the induced current for maximum correction. The top characteristic is improved at the expense of a small impairment of the bottom characteristic.

BACKGROUND OF THE INVENTION

Field of the invention

This invention relates generally to television receivers and particularly to correction of pincushion distortion in a television raster.

Description of the prior art

Pincushioning is a distortion of the television raster encountered when magnetic deflection systems are used in combination with relatively flat picture tubes. The distortion as evidenced by a bowing or curving of what should be straight lines in the television image.

Most television receivers include some correcting scheme for pincushioning, generally either a compensating permanent magnetic field or a correcting current in the deflection windings. The latter technique is used most often in color receivers where permanent magnets can create additional problems. The typical circuit for implementing the latter type of correction is relatively expensive and complex.

SUMMARY OF THE INVENTION

The present invention, which may be used in either monochrome or color receivers, enables the construction of a less expensive and simpler circuit to correct pincushion distortion. The invention takes advantage of the relatively good pincushion characteristic which most present day receivers exhibit at the bottom of the screen. The good bottom characteristic is traded for the relatively poor top characteristic to improve the latter at the expense of very little impairment of the former.

To achieve the correction, a small amount of horizontal frequency current is induced in the vertical deflecting windings. The current is phase shifted by about 90° with respect to the horizontal deflection current so that its maximum appears near the center of the horizontal sweep. In a preferred embodiment, a parallel resonant circuit, tuned near the horizontal frequency, is placed in series with the vertical windings and is shocked into a damped oscillation by the induced current. This circuit is tuned to provide the required phase shift. The horizontal frequency current may be induced by displacing the horizontal or vertical coils slightly off quadrature or by coupling directly into the coil of the parallel resonant circuit.

BRIEF DESCRIPTION OF DRAWINGS

A more detailed description of the invention will be given with reference to the accompanying drawing in which.

DESCRIPTION OF A PREFERRED EMBODIMENT

Figure 1:
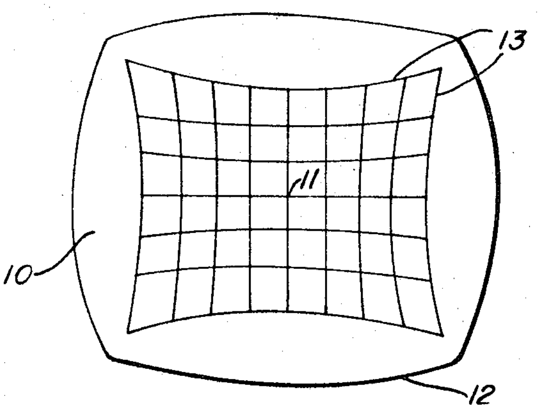
FIG. 1 is a diagram illustrating a distorted condition of a television picture.

FIG. 1 illustrates a typical distorted television raster 10 as viewed from a line through the center 11 of the screen 12. Pincushion distortion is illustrated by the bowing or curving of lines 13 which, in a correct reproduction, would be straight. The vertical pincushion distortion is generally more severe than the horizontal distortion, as illustrated.

The distortion is due primarily to the characteristic of magnetic deflection systems that the sine of the angle of deflection is proportional to the deflection current. Thus, with a spherical screen the viewer sees a normal raster, but with the relatively flat screens commonly employed in present day receivers, the increased distance which the electron beam travels at the extremities of the screen causes increased deflection and the distorted image. For a more detailed discussion of the causes of pincushion distortion see Fink, Television Engineering Handbook, § 6.5.

Because the screens of most receivers are curved slightly and because most receivers are normally viewed from a point above the center 11 of the screen 12, the bottom pincushion distortion is much less apparent to the viewer than the top distortion. The present invention utilizes this fact to improve the top characteristic at the expense of only a slight impairment of the bottom characteristic. The correction is accomplished with a simple and inexpensive circuit.

Figure 2:
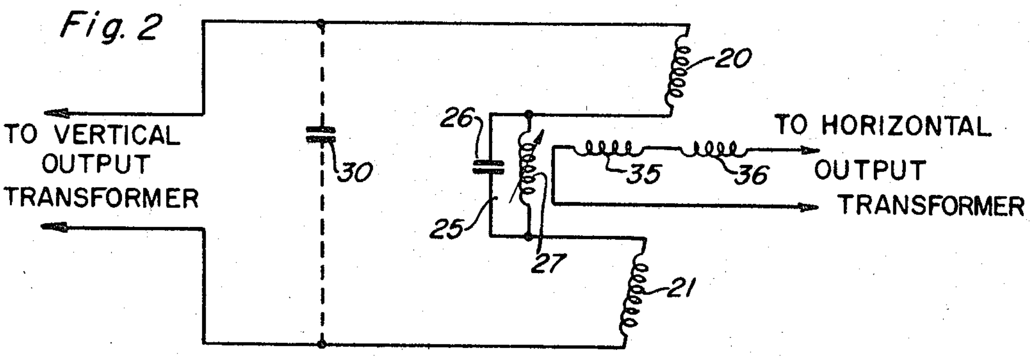
FIG. 2 is a schematic diagram of one embodiment of a circuit constructed according to the present invention.

FIG. 2 illustrates one embodiment of a correction circuit constructed according to the present invention. The correction is accomplished by inducing a small horizontal frequency current into the vertical windings and phase shifting the current to produce the optimum picture. The vertical windings 20, 21 are connected to the vertical output transformer (not shown) in the conventional manner. A high "Q" parallel resonant circuit 25, comprising a fixed capacitance 26 and a variable inductance 27 is inserted in series with the vertical windings 20, 21. The circuit 25 is resonant at a frequency near, but not necessarily precisely at, the horizontal deflection frequency of 15.750 kc. (kilocycles) to provide a phase shift for the horizontal frequency current. The distributed capacitance of the vertical output transformer is illustrated by the capacitor 30 connected across the transformer by the dotted lines.

The horizontal windings 35, 36 are connected to the horizontal output transformer (not shown) in the conventional manner. Normally the horizontal windings are in quadrature with the vertical windings and a negligible amount of horizontal current is induced in the vertical windings 20, 21. According to the present invention the vertical windings 20, 21 are rotated relative to the horizontal windings 35, 36 to a slightly off quadrature position to increase the horizontal-vertical coupling and induce current at the horizontal frequency in the vertical windings. The exact degree of rotation is not important for purposes of the present discussion and is best determined experimentally for the particular television receiver under consideration. The amplitude of the horizontal current induced in the vertical windings will depend upon the degree of rotation of the horizontal windings. While rotation of the windings is a convenient means for inducing the horizontal frequency current in the vertical windings, it is in no sense the only means contemplated by the present invention. For example, the horizontal current may be induced in the coil 27 of the resonant circuit 25.

Figure 3:
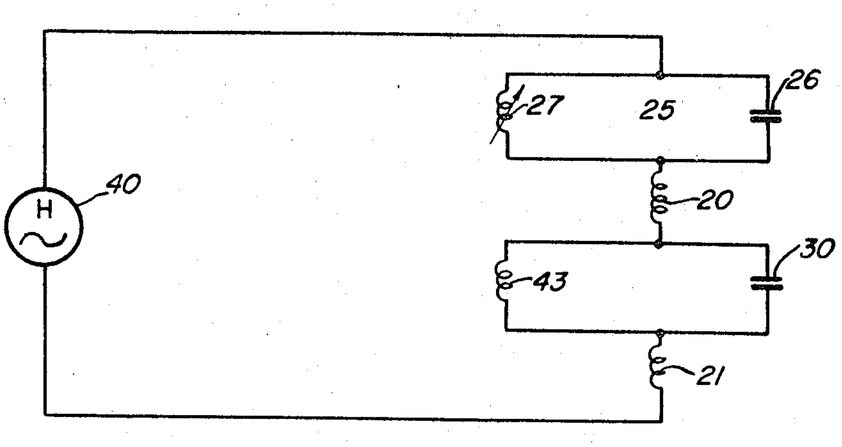
FIG. 3 is a schematic representation of an equivalent circuit of that shown in FIG. 2.

The operation of the correction circuit shown in FIG. 2 is best illustrated by the equivalent circuit shown in FIG. 3. The equivalent circuit includes the series combination of two vertical windings 20, 21, the inserted parallel resonant circuit 25, a horizontal frequency voltage source 40 representing the induced horizontal current, and the parallel combination of the inductance 43 of the vertical output transformer, and its distributed capacitance 30. The waveform of the generator 40 corresponds approximately to the horizontal sweep waveform occurring at the horizontal frequency and being either positive or negative depending upon the relative orientation of the vertical and horizontal windings. The capacitance 30 may be increased by the addition of a capacitor to lower the impedance at the horizontal frequency.

With the horizontal windings displaced off quadrature, the source 40 shocks the resonant circuit 25 into oscillation at the horizontal frequency. The variable inductor 27 of the parallel resonant circuit 25 is tuned for the best pincushion characteristic. Best correction is generally achieved with the maximum correction current flowing at the instant corresponding to the center of the horizontal sweep. This is normally desirable since the correction should be a maximum at this point. The particular amount of phase shift is best determined by experimentally adjusting the inductor for each particular receiver.

What is claimed is:

1. A pincushion correction circuit for a television receiver which includes horizontal and vertical deflection windings for producing deflecting magnetic fields comprising:

(a) means including the horizontal deflection windings for magnetically inducing a current periodic at the horizontal deflection frequency in the vertical windings; and (b) circuit means in series with the vertical windings for phase shifting the induced horizontal frequency current.

2. The circuit of claim 1 wherein said circuit means is adjustable.

3. The circuit of claim 1 wherein the horizontal deflection windings and the vertical deflection windings are placed in an off quadrature position with respect to one another.

4. The circuit of claim 3 wherein the horizontal deflection windings and the vertical deflection windings are mechanically movable with respect to one another to control the amplitude of pincushion correction.

5. The circuit of claim 1 wherein said circuit means includes a parallel resonant circuit connected in series with the vertical deflection windings.

6. The circuit of claim 5 wherein the parallel resonant circuit includes at least one variable impedance.

7. The circuit of claim 6 wherein said variable impedance is a variable inductance.

References Cited

UNITED STATES PATENTS 3,320,469 5/1967 Slavik -------------- 315—24

RODNEY D. BENNETT, Jr., *Primary Examiner.*

T. H. TUBBESING, *Assistant Examiner.*